(12) United States Patent
Togama et al.

(10) Patent No.: US 7,938,477 B2
(45) Date of Patent: May 10, 2011

(54) STOPPER STRUCTURE FOR A TILT TYPE CABIN

(75) Inventors: Jiro Togama, Sagamihara (JP); Yoshiro Ogawa, Sagamihara (JP); Yoshiaki Numata, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/301,590

(22) PCT Filed: Nov. 27, 2007

(86) PCT No.: PCT/JP2007/073283
§ 371 (c)(1),
(2), (4) Date: Feb. 6, 2009

(87) PCT Pub. No.: WO2008/096496
PCT Pub. Date: Aug. 14, 2008

(65) Prior Publication Data
US 2010/0060034 A1 Mar. 11, 2010

(30) Foreign Application Priority Data
Feb. 9, 2007 (JP) .................................. 2007-030629

(51) Int. Cl.
*B62D 33/07* (2006.01)
(52) U.S. Cl. ................... 296/190.06; 292/272; 292/273; 292/338; 16/83; 180/89.14
(58) Field of Classification Search ............. 296/100.08, 296/100.07, 56, 190.06, 106; 292/266, 269, 292/272, 273, 277, 338, DIG. 29; 16/83, 85; 217/60 F; 180/89.14
See application file for complete search history.

(56) References Cited

U.S. PATENT DOCUMENTS

| 2,220,876 A | * | 11/1940 | Carter | 217/60 F |
| 2,253,561 A | * | 8/1941 | Harden | 217/60 F |
| 2,916,176 A | * | 12/1959 | Widmer | 217/60 F |
| 4,447,089 A | * | 5/1984 | Tegtmeier | 298/11 |

FOREIGN PATENT DOCUMENTS
JP 58-98279 U 7/1983
(Continued)

*Primary Examiner* — Dennis H Pedder
(74) *Attorney, Agent, or Firm* — Birch, Stewart, Kolasch & Birch, LLP

(57) ABSTRACT

There is provided a stopper structure for a tilt type cabin mounted on an industrial vehicle, which is capable of preventing a cabin from lowering during a working so as to enhance the safety. The stopper structure 1 for a tilt type cabin incorporated in an industrial vehicle 31 in which the cabin 33 is pivotally supported to a vehicle body 33 so as to be tiltable, comprises a rod 33 connected at its one end to the cabin 33, a casing 2 attached to one end to the vehicle body 31, the casing 2 having a guide groove 5 in which a stopper pin 11 secured to the rod 10 is slidably fitted, and which defines an upper locking part 7 on the upper side of the gravitational center of the cabin 33 as a criterion with respect to the vehicle body 31, and a lower locking part 6 on the lower side thereof, an urging spring 18 for urging the rod 10 toward the locking parts 6, 7, and a release lever 15 for pressing the rod 10 toward the side remote from the urging spring 18 so as to release the lock of the rod 10 from the locking parts 6, 7.

4 Claims, 6 Drawing Sheets

FOREIGN PATENT DOCUMENTS

| | | |
|---|---|---|
| JP | 62-97084 U | 6/1987 |
| JP | 6-29985 U | 4/1994 |
| JP | 2000-118448 A | 4/2000 |
| JP | 2000-264260 A | 9/2000 |
| JP | 2006-76389 A | 3/2006 |

* cited by examiner

STOPPER STRUCTURE FOR A TILT TYPE CABIN

TECHNICAL FIELD

The present invention relates to a stopper structure for a tilt type cabin mounted on an industrial vehicle, which is capable of ensuring a safety during inspection and maintenance in the condition that the cabin is tilted up.

BACKGROUND ART

There has been presented, as a one kind of industrial vehicles including forklifts, an industrial vehicle mounted thereon with a tilt type cabin. Such an industrial vehicle has the structure that a cabin is pivotally supported at its one side to a vehicle frame so as to be downward tiltable on one side of a vehicle body. In the industrial vehicle having the above-mentioned configuration, the cabin is tilted down so as to open an engine compartment underneath the cabin in order to readily carry out inspection and maintenance or the like (refer to, for example, Patent Document 1 (Japanese Patent Laid-Open No. 2000-118448)).

Referring to FIG. 5 which shows a forklift as an example in a tilt-up condition, a forklift 50 as shown incorporates a vehicle body 51 and a cabin 52 arranged above the vehicle body. The cabin 52 is box-like and is provided therein with a seat for a worker, and a control portion. The lower part of the cabin 52 is pivotally supported at its one side to the vehicle body through pivotable hinges or the like, and is downward tiltable toward one side of the vehicle body by means of a hydraulic mechanism which is not shown. Further, the cabin 52 has a support part for fixing the opening side thereof in a normal condition in which the cabin 50 is returned to an operating position.

Among tilt type cabins as stated above, there has been presented the one which incorporates a lock mechanism for holding the cabin having been tilted down.

Patent Document 2 (Japanese Patent Laid-Open No. 2006-76389) discloses a cabin lock mechanism comprising a lock plate provided to a cabin which is pivotally mounted on a vehicle body, and a mount portion which is engageable with a fitting hole formed in the lock plate and which is secured to the vehicle body, the loc plate and the mount portion constituting a lock mechanism, the mount portion having a locking groove engageable with a part of the peripheral part of the fitting hole in the lock plate, and the lock plate being held so as to be slidably supported by a guide mechanism which is attached to a bracket extending from the cabin. Thus, the cabin can be locked and mounted by sliding the lock plate.

Thus, with the lock mechanism disclosed in Patent Document 2, the cabin can be tilted down under the operation of an urging member such as a torsion bar, a spring or the like during inspection and maintenance by releasing the lock mechanism, and after the completion of the inspection and maintenance, the cabin is lowered and is then locked to the vehicle body. However, should the cabin be unexpectedly unlocked in the tilt-up condition, the cabin would be lowered during the inspection and maintenance or the like, resulting in an extremely dangerous condition. However, in the conventional industrial vehicle, a safety mechanism for preventing the cabin from being lowered during working has not yet been, indeed, considered.

DISCLOSURE OF THE INVENTION

Accordingly, the present invention is devised in view of the problems inherent to the above-mentioned conventional technology, and an object of the present invention is to provide a stopper structure for a tilt type cabin mounted on an industrial vehicle, for preventing the cabin from falling down during a working so as to enhance the safety.

To the end, according to the present invention, there is provided a stopper structure for a tilt type cabin which is incorporated in an industrial vehicle so as to be pivotally supported to a vehicle boy, characterized by: comprising a rod connected on one end side to the cabin, a casing through which the rod is inserted and which is attached on one end side to the vehicle body, wherein the casing has a guide groove defining therein an upper locking on the upper side of the gravitational center of the cabin as a boundary during a tilt of the cabin with respect to the vehicle body, a lower locking part on the lower side thereof, an urging spring for urging the rod toward the locking part side, and a release lever for pressing the rod toward the side remote from the urging spring so as to release a lock of the rod from the locking parts.

According to the present invention, the upper locking part and the lower locking part are provided respectively on the upper side and the lower side of the gravitational center of the cabin as a boundary, when the cabin is tilted. That is, upon a tilt of the cabin, the upper locking part serves as a locking part adapted to lock the stopper pin at a position at which the gravitational center of the cabin is located outward from the vehicle body and at which the cabin is to move toward the side where the cabin is opened, and the lower locking part serves as a locking part adapted to lock the stopper pin at a position at which the gravitational center of the cabin is located inward from the vehicle body and at which the cabin is to move toward the side where the cabin is closed.

The upper locking part defines an opening limit required for inspection and maintenance, thereby it is possible to prevent the cabin from being excessively tilted. It is noted that the cabin may be opened at maximum by tilting the cabin up to an end of the guide groove, exceeding the upper locking part when it is required to widely open the engine compartment in the case of, for example, replacement of engines.

Meanwhile, the lower locking part located on the lower side allows the cabin to come to a stop in the case that an urging member or the like for maintaining a tilt-up condition accidentally comes off, and accordingly, it is possible to prevent occurrence of the accident that a worker is caught between the cabin and the vehicle body, and so forth, thereby it is possible to ensure a safety.

Further, the present invention is characterized in that there are provided a plurality of the upper locking parts and/or the lower locking parts.

With the provision of the plurality of locking parts as stated above, the tilt angle can be set through several steps, thereby it is possible to provide a mechanism which can accept the worker's needs.

Further, the present invention is characterized in that the above-mentioned guide groove is provided with a guide part projected toward the locking parts, on the side opposed to these locking parts.

Thus, with the provision of the guide part, the rod can be surely locked in the locking part, and as well, the motion of the rod can become smooth.

Further, the present invention is characterized in that the release lever is adapted to be operated through the intermediary of a manipulation wire which can be manipulated only from the outside of the vehicle body.

Thus, the release lever is never operated in the condition that the worker is present underneath the cabin, and accordingly, an erroneous manipulation of the release lever can be avoided, thereby it is possible to enhance the safety.

As stated above, according to the present invention, there can be provided a safety mechanism capable of having the function that the angle of the cabin on both lowering side and opening side is limited, and ensuring an appropriate angle upon a tilt of the cabin.

That is, with the provision of the upper locking member on the upper side of the gravitational center of the cabin as a boundary, it is possible to prevent the cabin from being excessively tilted, and further, with the provision of the lower locking member on the lower side thereof, it is possible to prevent occurrence of the accident that a worker is caught between the cabin and the vehicle body and so forth, thereby it is possible to ensure a safety.

Further, with the provision of a plurality of locking parts, the tilt angle can be set through several steps, and accordingly it is possible to provide a mechanism which can accept the worker's needs.

Further, with the provision of the guide part on the side opposed to the locking part, the rod can be surely locked, and further, can be smoothly moved.

Moreover, since the release lever is adapted to be operated through the intermediary of the manipulation wire which can be manipulated only from the outside of the vehicle body, the release lever is never operated in the condition that the worker is present underneath the cabin, avoiding occurrence of erroneous operation of the release lever, thereby it is possible to enhance the safety.

BEST MODE FOR CARRYING OUT THE INVENTION

Detailed explanation will be made of a preferred and exemplified embodiment of the present invention with reference to the accompanying drawings. It is noted that dimensions, materials, shapes, relative arrangements and the like of components stated in the embodiment should not be intended to limit the technical scope of the invention unless otherwise specified, but are mere explanatory examples.

Figure 1:
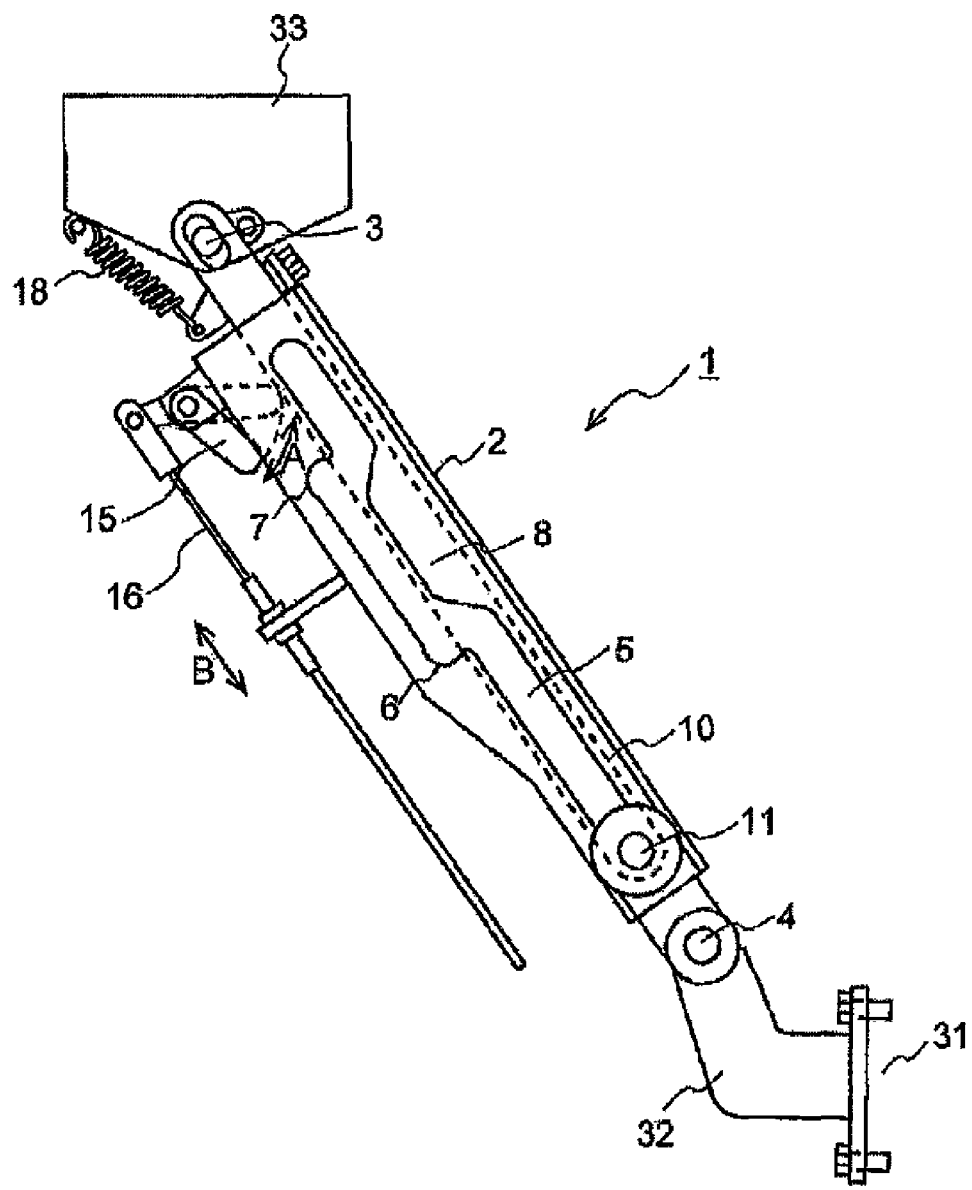
FIG. 1 is a side view illustrating a stopper structure in an embodiment of the present invention.
Figure 2:
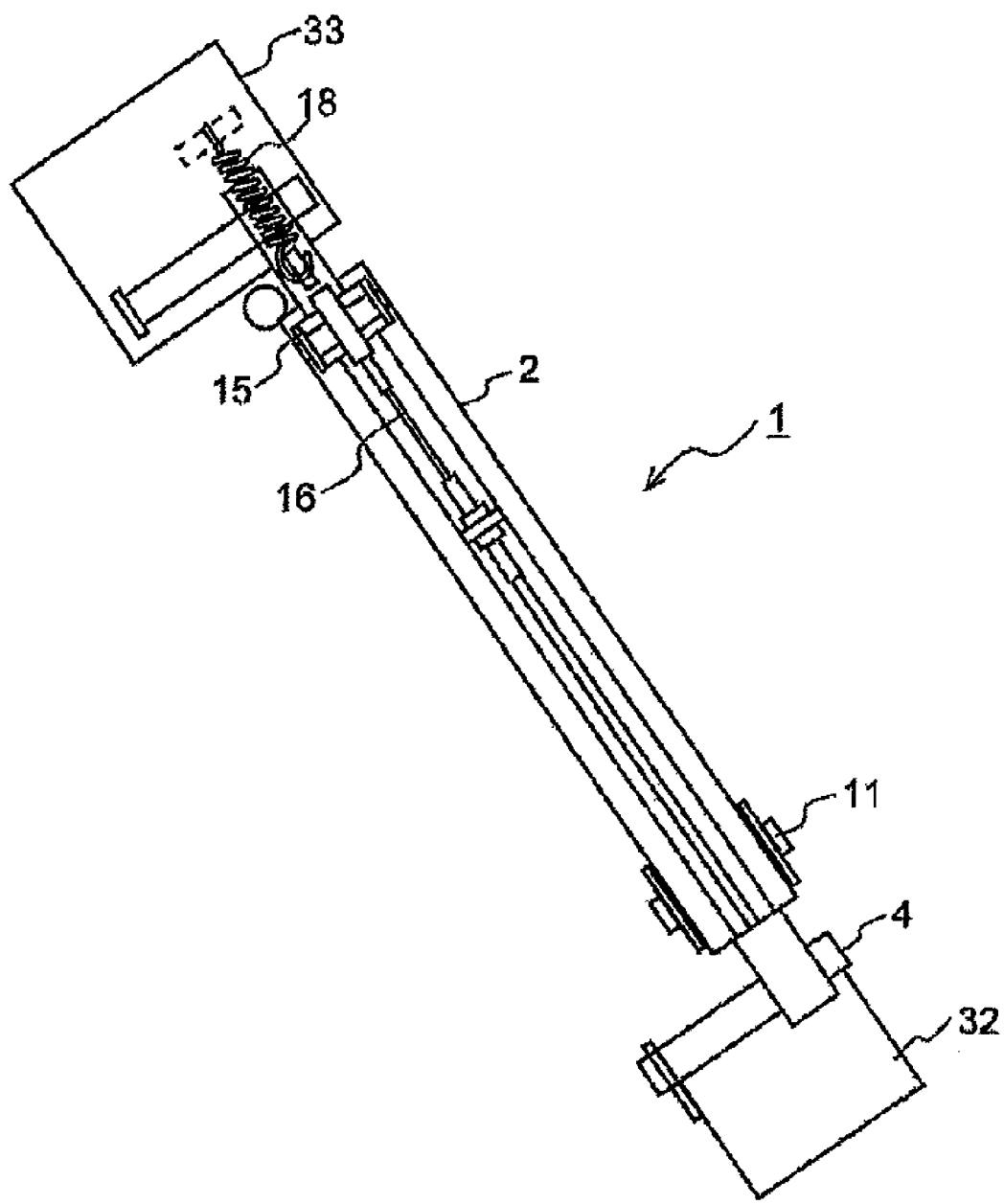
FIG. 2 is a front view illustrating the stopper structure in the embodiment of the present invention.
Figure 3:
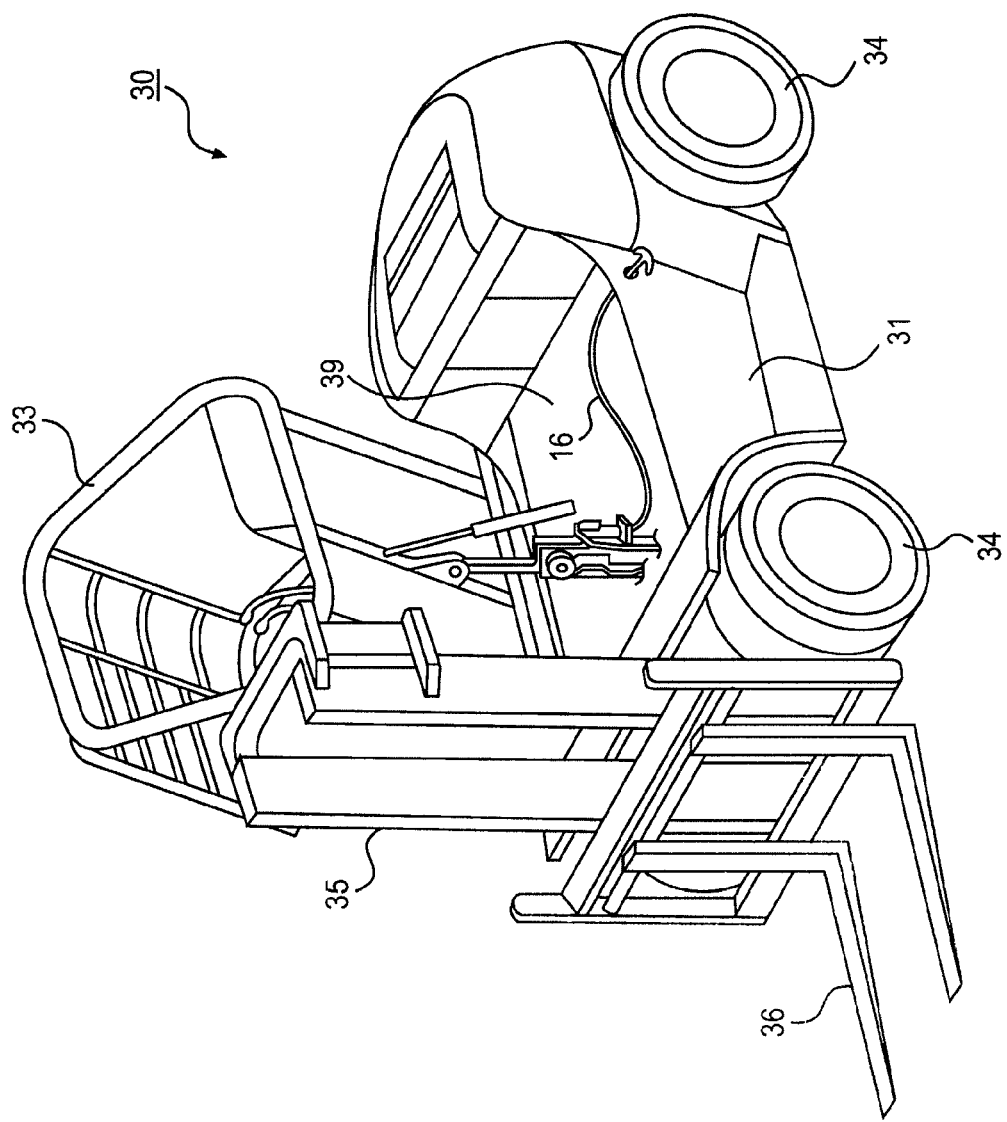
FIG. 3 is a perspective view illustrating a forklift incorporating the stopper structure in the embodiment of the present invention, in a tilt-up condition.
Figure 4:
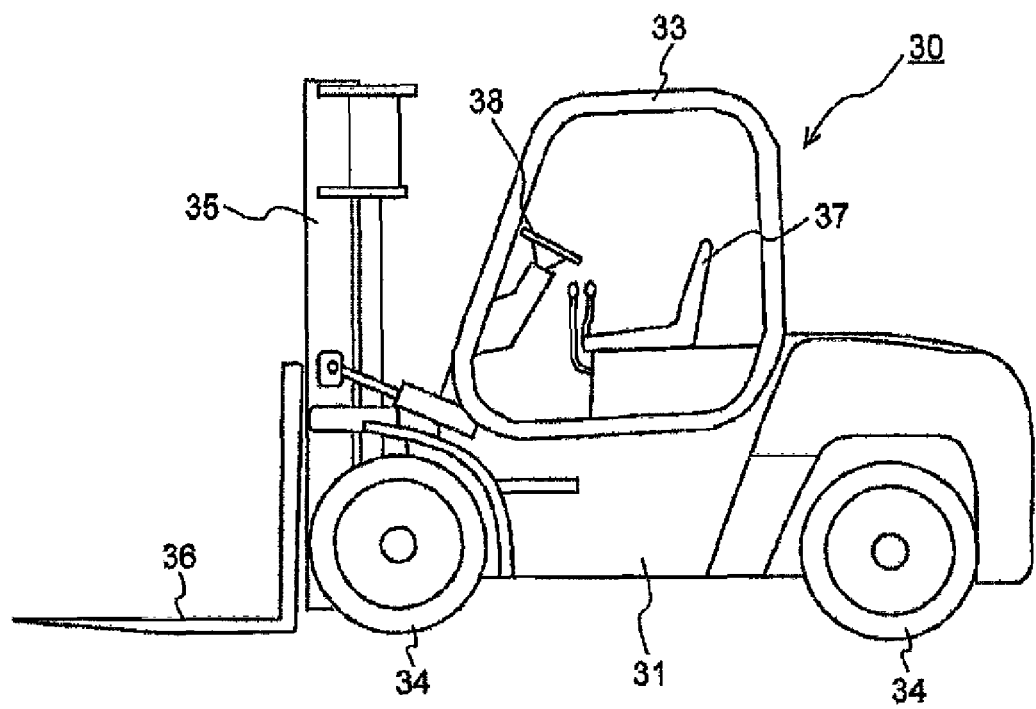
FIG. 4 is a side view illustrating the forklift shown in FIG. 3 in a normal condition.
Figure 5:
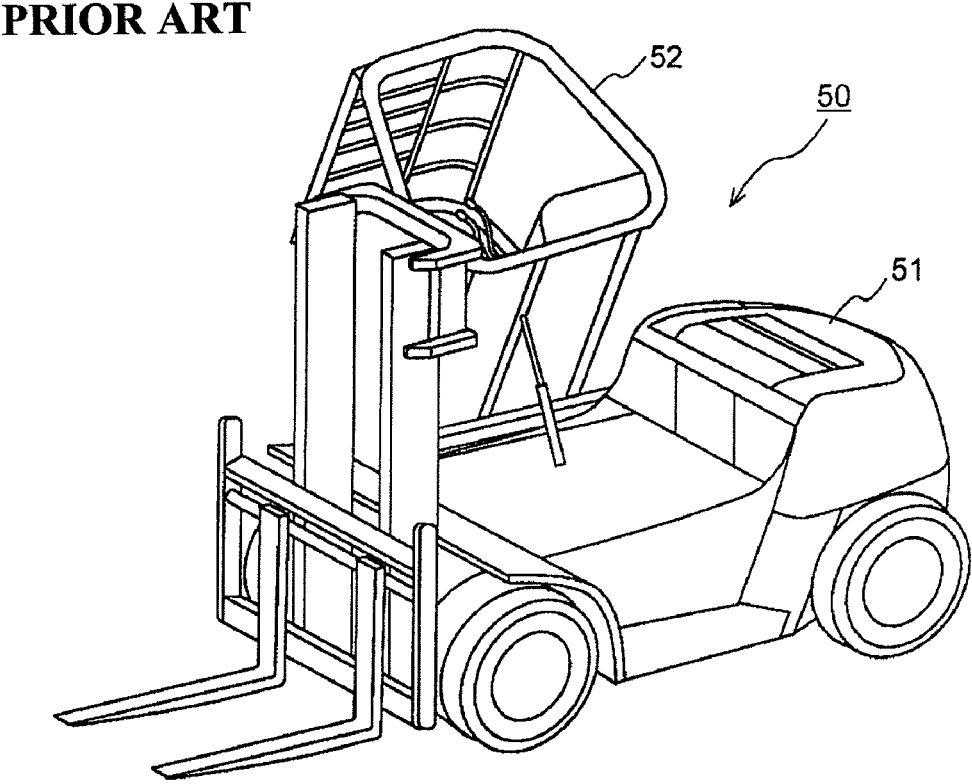
FIG. 5 is a perspective view illustrating a conventional forklift in a tilted condition.

FIG. 1 is a side view illustrating a stopper structure in the embodiment of the present invention, FIG. 2 is a front view illustrating a stopper structure in the embodiment of the present invention, FIG. 3 is a forklift incorporating the stopper structure in the embodiment of the present invention in a tilt-up condition, FIG. 4 is a side view illustrating the forklift shown in FIG. 3 in a normal condition.

In this embodiment, explanation will be made of the case that the present invention is applied to the forklift as an example. However, the present invention should not be limited to this case, but can be applied to any of tilt type industrial vehicle each incorporating a tilt type cabin.

Embodiment

At first, referring to FIGS. 3 and 4, explanation will be made of the forklift to which the stopper structure in this embodiment is applied. The forklift 30 comprises a vehicle body 31, a seat 37 mounted on the upper part of the vehicle body, and adapted to be taken by a worker, a box-like cabin 33 having an operation panel 38, wheels 34 mounted to the vehicle body 31, and a mast 35 mounted to the front part of the vehicle body 31 for moving up and down forks 36 for carrying thereon a load.

In this forklift 30, the cabin 33 is tiltable for inspection and maintenance. That is, a frame serving as the floor surface of the cabin is pivotably supported at its one side to the vehicle body 31 by means of a hinged joint or the like, and accordingly, by tilting the cabin in one direction as necessary, an engine compartment 39 arranged underneath the cabin 33 can be opened.

Upon a tilt of the cabin 33, the cabin 33 is held at a predetermined angle by means of the hydraulic mechanism such as a hydraulic cylinder coupled at one end to the cabin and attached at the other end side to the vehicle body 31.

Further, in this embodiment, there is incorporated a stopper structure attached to both vehicle body 31 and cabin 33, similar to the hydraulic mechanism.

FIGS. 1 and 2 show the configuration of the stopper structure.

As shown in these figures, the stopper structure 1 incorporates a casing 2 which is rotatably supported at its one end to a support bracket secured to the vehicle body 31 by means of a support pin 4, and a rod 10 inserted through the casing 2, and supported to the cabin 33, at its end part on the side remote from the casing 2, by means of a support pin 3.

The rod 10 is provided with a stopper pin 11 at an end part on the side remote from the support pin 3. The casing 2 is formed therein with a substantially linear guide groove 5 in the axial direction thereof. The guide groove 5 defines a lower locking part 6 and an upper locking part 7 which are formed, in its intermediate part, having a stepped-like shape.

These locking parts are arranged so that the lower locking part 6 is located on the lower side of the gravitational center of the cabin as a boundary with respect to the vehicle body, and the upper locking part 7 is located on the upper side thereof. That is, the lower locking part 6 is provided at a position where the cabin is moved toward the lowering side, and the upper locking part 7 is provided at a position where the cabin is moved toward the opening side upon a tilt of a cabin.

Figure 6:
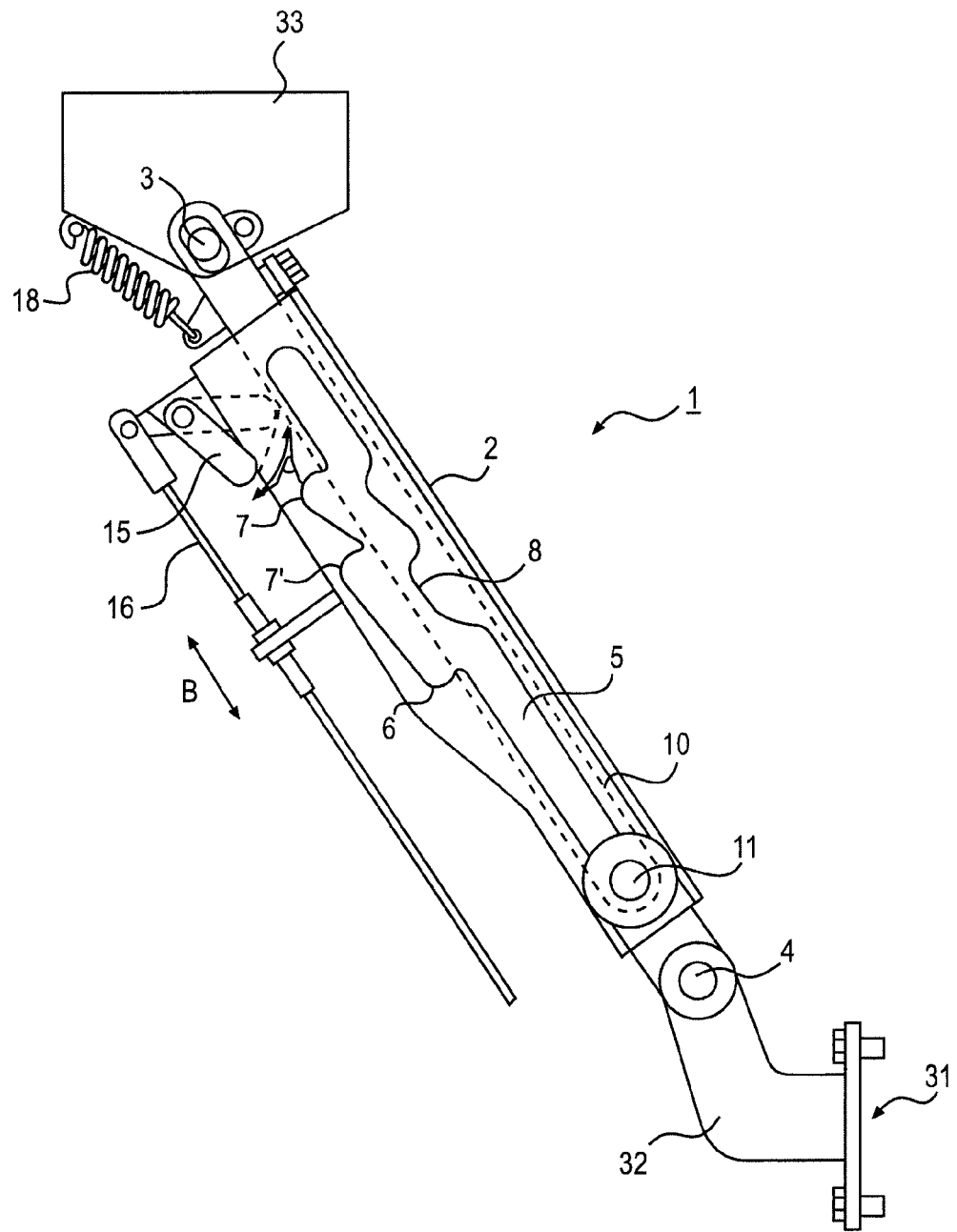
FIG. 6 is a side view, similar to FIG. 1, showing an embodiment of the invention having multiple upper locking parts.

These locking parts 6, 7 may be provided by plural numbers, respectively, and accordingly, the tilt angle can be set through several steps, and there may be provided a mechanism which can accept the worker's needs. This is illustrated in FIG. 6, which shows a device similar to that illustrated in FIG. 1. However the embodiment of FIG. 6 compresses plural upper locking parts 7,7' which facilitate locking of rod 10 at either of these positions. Likewise, plural lower locking parts 6 can be provided at the lower position.

Further, the rod 10 is urged toward the locking parts 6, 7 by means of an urging spring 18 which is secured to at one end to the cabin 33 and at the other end to the rod 10.

Further, a release lever 15 for pressing the rod 10 away from the locking parts 6, 7 is provided on one side of the rod 10. The release lever 15 is connected to a manipulation wire 16, and accordingly, by moving the manipulation wire 16 in the directions of the arrow B shown in the figure, the release lever 15 is rotated in the direction of the arrow A so as to cause the rod 10 to be engaged with and disengaged from the locking parts 6, 7.

Further, the manipulation wire 16 can be manipulated only from the outside of the vehicle body, that is, the outside of the engine compartment, as illustrated in FIG. 3, and accordingly, the release lever can never be operated in the condition that a worker is present underneath the cabin, thereby it prevents the release lever from being erroneously operated, and enhance the safety.

Further, it is preferred to provide a guide part 8 on the side opposed to the lower locking part 6 and the upper locking part 7, being projected toward these locking parts 6, 7. With the provision of the guide part 8, the rod 10 can be surly locked to the locking parts, and as well, can be smoothly operated.

In this embodiment, the upper locking part 7 is provided on the upper side of the gravitation center of the cabin as a boundary, and is set to an opening limit which is required for inspection and maintenance. Thus, it is possible to prevent the cabin from being excessively tilted. It is noted that the cabin can be tilted up to an end part of the guide groove, passing by the upper locking part 7 so as to open the engine compartment at maximum if it is required to open widely the engine compartment for replacement of engines or the like.

Meanwhile, the lower locking part 6 provided on the lower side is adapted to stop the cabin if an urging member for maintaining the cabin in a tilted condition comes off unexpectedly, and accordingly, the accident that a worker is caught between the cabin and the vehicle body can be avoided, thereby it is possible to ensure a safety.

Thus, in this embodiment, with the provision of the function that the angle of the cabin is limited on both lowering side and opening side, thereby it is possible to ensure an appropriate angle when the cabin is tilted.

INDUSTRIAL APPLICABILITY

According to the present invention, the safety is ensured during a tilt-up of a cabin for inspection and maintenance with the use of a stopper structure which can be simply manipulated, and accordingly, the present invention can be appropriately used, in general, for various industrial vehicles of tiltable cabin installation type.

The invention claimed is:

1. A stopper structure for a tilt type cabin mounted on an industrial vehicle, and pivotally supported to a vehicle body so as to be tiltable, characterized by comprising a rod connected at its one end side to the cabin, a casing through which the rod is inserted and which is attached at its one end to the vehicle body, wherein the casing has a guide groove defining therein an upper locking part on the upper side of the gravitational center of the cabin as a boundary during a tilt of the cabin with respect to the vehicle body, a lower locking part on the lower side thereof, an urging spring for urging the rod toward the locking part side, and a release lever for pressing the rod toward the side remote from the urging spring so as to release a lock of the rod from the locking parts.

2. A stopper structure for a tilt type cabin as set forth in claim 1, characterized in that there are provided a plurality of the upper locking parts and/or the lower locking parts.

3. A stopper structure for a tilt type cabin as set forth in claim 1, characterized in that the guide groove is formed therein with a guide part projected toward the locking parts, on the side opposed to the locking parts.

4. A stopper structure for a tilt type cabin as set forth in claim 1, characterized in that the release lever is operated by a manipulation wire which can be manipulated only from the outside of the vehicle body.

* * * * *